(12) United States Patent
Sakurai

(10) Patent No.: US 9,409,346 B2
(45) Date of Patent: Aug. 9, 2016

(54) THREE-DIMENSIONAL PRINTING APPARATUS

(71) Applicant: Roland DG Corporation, Hamamatsu-shi, Shizuoka (JP)

(72) Inventor: Takayuki Sakurai, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 14 days.

(21) Appl. No.: 14/454,790

(22) Filed: Aug. 8, 2014

(65) Prior Publication Data

US 2015/0044319 A1     Feb. 12, 2015

(30) Foreign Application Priority Data

Aug. 9, 2013   (JP) .................................. 2013-166841

(51) Int. Cl.
*B29C 67/00*     (2006.01)
(52) U.S. Cl.
CPC ......... *B29C 67/0085* (2013.01); *B29C 67/0066* (2013.01); *B29C 67/0092* (2013.01)
(58) Field of Classification Search
CPC ............ B29C 67/0066; B29C 67/0085; B29C 67/0092
USPC ...................................................... 425/174.4
See application file for complete search history.

(56) References Cited

U.S. PATENT DOCUMENTS

2013/0052292 A1    2/2013   Busato

FOREIGN PATENT DOCUMENTS

JP    2012-187807 A    10/2012
WO   2011/144580 A1   11/2011

OTHER PUBLICATIONS

Official Communication issued in corresponding European Patent Application No. 14180465.8, mailed on Feb. 12, 2015.

*Primary Examiner* — Robert J Grun
(74) *Attorney, Agent, or Firm* — Keating and Bennett, LLP

(57) ABSTRACT

A three-dimensional printing apparatus includes a base including an opening, a tank placed on the base and storing a liquid photo-curable resin, an optical device including a light source that emits light and arranged to irradiate the resin inside the tank with light emitted from the light source through the opening, a shutter that covers the opening in an openable and closable manner, a slide guide that guides sliding of the tank so that the tank is slidable between a preparation position located outside of a region over the opening and an installation position located over the opening, and an interlocking device that opens and closes the shutter in conjunction with sliding of the tank so that the shutter is opened when the tank is located over the entire opening, and the shutter is closed when the tank is not located over at least a portion of the opening.

12 Claims, 9 Drawing Sheets

THREE-DIMENSIONAL PRINTING APPARATUS

This application claims priority to Patent Application No. 2013-166841 filed in Japan on Aug. 9, 2013, the entire contents of which are hereby incorporated by reference.

BACKGROUND OF THE INVENTION

1. Field of the Invention

The present invention relates to three-dimensional printing apparatuses.

2. Description of the Related Art

A three-dimensional printing apparatus is conventionally known in which a liquid photo-curable resin stored inside a tank is irradiated with light so as to cure the photo-curable resin, thus forming a three-dimensional object. A three-dimensional printing apparatus of this type includes a base, a tank, and a raisable and lowerable holder. The base is provided with an opening. The tank is placed on the base. The holder is disposed above the tank. An optical device including a light source and a mirror, for example, is disposed below the base. Light emitted from the light source is reflected by the mirror. A resin inside the tank is irradiated through the opening of the base with the light reflected by the mirror. A portion of the resin inside the tank which has been irradiated with the light is cured. By controlling a light irradiation position, a position at which the resin is to be cured is appropriately changed. Hence, the cured resin can form a desired cross-sectional shape. A desired cross-sectional shape is continuously formed downward by sequentially raising the holder. As a result, a desired three-dimensional object is formed by the cured resin.

In the above-described three-dimensional printing apparatus, the tank that stores a photo-curable resin in liquid form is placed on the base before a three-dimensional object is formed. After the three-dimensional object has been formed, the tank in which the photo-curable resin in liquid form remains is moved from a position on the base. In this case, the photo-curable resin might scatter from the tank. The scattered photo-curable resin might adhere to the optical device through the opening. A known solution to this problem is to close the opening with a transparent plate made of glass, for example, so that the scattered resin does not pass through the opening.

However, when the opening is closed with the transparent plate, the light emitted from the light source is undesirably attenuated through the transparent plate before being applied to the photo-curable resin, thus disadvantageously preventing the resin inside the tank from being efficiently cured. Furthermore, the resin scattered from the tank might adhere to the transparent plate. The resin adhered to the transparent plate might block the light emitted from the light source.

A proposed solution to these problems is to provide the opening with a shutter that is controllable so as to be opened and closed. JP 2012-187807 A discloses a three-dimensional printing apparatus that includes a sensor that detects whether or not a tank is placed on a base, and a motor that drives a shutter so that the shutter is opened and closed. The sensor includes a protrusion that can be protruded from and retracted into the base, and a spring that constantly urges the protrusion upward. Upon placement of the tank on the base, the protrusion is pushed down by a bottom wall of the tank. Thus, the protrusion is retracted into the base. Upon removal of the tank from a position on the base, the protrusion protrudes from the base due to a force of the spring. The sensor detects whether or not the tank is placed on the base on the basis of a state of the protrusion. In this three-dimensional printing apparatus, upon detection of placement of the tank on the base, the shutter is automatically opened by the motor. In contrast, upon detection of removal of the tank from the position on the base, the shutter is automatically closed by the motor.

The three-dimensional printing apparatus disclosed in JP 2012-187807 A is arranged so that the tank is placed on the base from above in such a way as to push down the protrusion. Therefore, when the tank is placed on the base, a gap might briefly be provided between the tank and the base, with the shutter opened. When the tank is moved away from the base, a gap might also be provided between the tank and the base, with the shutter opened. Thus, a photo-curable resin might enter through the gap. As a result, the photo-curable resin might adhere to an optical device.

SUMMARY OF THE INVENTION

Accordingly, preferred embodiments of the present invention provide a three-dimensional printing apparatus in which a photo-curable resin is unlikely to adhere to an optical device through an opening of a base.

A three-dimensional printing apparatus according to a preferred embodiment of the present invention includes a base, a tank, an optical device, a holder, a shutter, a slide guide, and an interlocking device. The base is provided with an opening. The tank is placed on the base, and stores a photo-curable resin in liquid form. The optical device is disposed below the base, and includes at least a light source that emits light. The optical device irradiates the photo-curable resin inside the tank with the light emitted from the light source through the opening. The holder is raisable and lowerable, and lifts the photo-curable resin that has been cured with irradiation of the light. The shutter covers the opening in an openable and closable manner. The slide guide guides sliding of the tank on the base so that the tank is slidable between a preparation position located outside of a region over the opening and an installation position located over the opening. The interlocking device opens and closes the shutter in conjunction with sliding of the tank on the base so that the shutter is opened when the tank is located over the entire opening, and the shutter is closed when the tank is not located over at least a portion of the opening.

In the above-described three-dimensional printing apparatus, the slide guide guides sliding of the tank on the base. The tank is moved between the preparation position and the installation position by sliding the tank on the base and along the slide guide. The shutter is opened and closed in conjunction with sliding of the tank so that the shutter is opened when the tank is located over the entire opening of the base, and the shutter is closed when the tank is not located over at least a portion of the opening. Therefore, unlike the apparatus disclosed in JP 2012-187807 A, no gap is provided between the tank and the base, with the shutter opened. As a result, the photo-curable resin scattered from the tank is prevented from adhering to the optical device through the opening.

According to one preferred embodiment of the present invention, the interlocking device is preferably arranged to move the shutter in conjunction with sliding of the tank so that the interlocking device starts opening the shutter after the tank has slid to a position at which the tank is located over the entire opening, and finishes closing the shutter before the tank slides to a position at which the tank is not located over at least a portion of the opening.

The tank moves from the preparation position to the installation position by sliding on the base. When the tank has moved to the position located over the entire opening, the opening is completely covered with the tank. Therefore, according to the above-described preferred embodiment, the shutter starts to open after the opening has been completely covered with the tank. The tank moves from the installation position to the preparation position by sliding on the base. The opening is completely covered with the tank until the tank is not located over at least a portion of the opening of the base. Therefore, according to the above-described preferred embodiment, the shutter finishes closing before the opening is not completely covered with the tank. As a result, the photo-curable resin scattered from the tank is more reliably prevented from adhering to the optical device through the opening.

According to another preferred embodiment of the present invention, the interlocking device preferably includes an engagement member, a connection member, and an elastic member. The engagement member preferably engages with the tank and moves in response to sliding of the tank. The connection member preferably connects the engagement member and the shutter to each other so that the shutter is opened and closed in response to the movement of the engagement member. The elastic member preferably applies an elastic force to the shutter so that the shutter is closed.

According to the above-described preferred embodiment, the shutter is mechanically and automatically opened and closed in response to sliding of the tank. Therefore, a tank detection sensor and a shutter driving motor are unnecessary. For example, when a tank detection sensor and a shutter driving motor are used, the tank is detected by the sensor, and then the motor is driven to open or close the shutter. In that case, a control time delay occurs between the detection by the sensor and opening or closing of the shutter. Thus, the shutter might remain open even though the opening of the base is not covered with the tank. However, according to the above-described preferred embodiment, such a control time delay does not occur. As a result, the photo-curable resin scattered from the tank is suitably prevented from adhering to the optical device through the opening.

According to still another preferred embodiment of the present invention, when the tank slides from the installation position toward the preparation position, the tank preferably slides forward, and when the tank slides from the preparation position toward the installation position, the tank preferably slides rearward. The interlocking device preferably includes a guide rod, a slider, a link member, a rotation shaft, and a tension spring. The guide rod preferably extends in a front-rear direction. The slider is preferably provided on the shutter so as to be movable together with the shutter. The slider is preferably provided with a guide groove that extends in a vertical direction. The slider is preferably slidably engaged with the guide rod. The link member preferably includes an abutting portion, an engagement portion, and a rod portion. The abutting portion preferably abuts against a rear portion of the tank. The engagement portion is preferably slidably engaged with the guide groove of the slider. The rod portion preferably connects the abutting portion and the engagement portion to each other. The rotation shaft preferably extends in a right-left direction and supports a portion of the link member which is located between the abutting portion and the engagement portion. The tension spring preferably includes an upper end portion disposed behind the slider, and a lower end portion locked to a portion of the link member which is located between the rotation shaft and the engagement portion.

According to the above-described preferred embodiment, the shutter is opened and closed in response to sliding of the tank by using a simple structure.

According to yet another preferred embodiment of the present invention, the three-dimensional printing apparatus preferably further includes a lock mechanism that locks the tank at the installation position.

According to the above-described preferred embodiment, the tank is locked at the installation position by the lock mechanism. Hence, even if a shock is given to the tank, the tank does not move out of the installation position. Accordingly, the tank is stably and reliably held at the installation position.

According to still yet another preferred embodiment of the present invention, when the tank slides from the installation position toward the preparation position, the tank preferably slides forward, and when the tank slides from the preparation position toward the installation position, the tank preferably slides rearward. The tank preferably includes a bottom wall, a left wall that extends vertically from a left portion of the bottom wall, and a right wall that extends vertically from a right portion of the bottom wall. The slide guide preferably includes a left guide member and a right guide member. The left guide member is preferably attached onto the base. The left guide member preferably includes a left longitudinal plate that extends in a front-rear direction, and a left upper plate that extends rightward from the left longitudinal plate. The left guide member preferably comes into sliding contact with the left wall of the tank. The right guide member is preferably attached onto the base. The right guide member preferably includes a right longitudinal plate that extends in the front-rear direction, and a right upper plate that extends leftward from the right longitudinal plate. The right guide member preferably comes into sliding contact with the right wall of the tank.

According to the above-described preferred embodiment, the slide guide allows the tank to stably slide on the base.

According to another preferred embodiment of the present invention, when the tank slides from the installation position toward the preparation position, the tank preferably slides forward, and when the tank slides from the preparation position toward the installation position, the tank preferably slides rearward. The shutter preferably includes a plate portion and a protruded portion. The plate portion is preferably slidable in a front-rear direction. The protruded portion preferably protrudes upward from a rear end of the plate portion.

For example, suppose that the shutter includes the plate portion slidable in the front-rear direction and the photo-curable resin in liquid form has adhered onto the plate portion. In that case, when the shutter is moved forward, the adhered photo-curable resin might fall down from the rear end of the plate portion. The photo-curable resin that has fallen down might adhere to the optical device. However, according to the above-described preferred embodiment, the rear end of the plate portion is provided with the protruded portion that protrudes upward therefrom. Therefore, when the shutter is moved forward, the photo-curable resin adhered onto the plate portion is stopped by the protruded portion. Thus, the photo-curable resin adhered onto the plate portion is prevented from falling down. Consequently, the photo-curable resin is prevented from adhering to the optical device.

According to still another preferred embodiment of the present invention, the tank preferably includes a bottom wall, and side walls located laterally of the bottom wall. A lower surface of the bottom wall is preferably located higher than lower surfaces of the side walls.

According to the above-described preferred embodiment, the lower surfaces of the side walls come into contact with a surface of the base, but the lower surface of the bottom wall does not come into contact with the surface of the base. Thus, the bottom wall of the tank does not come into sliding contact with the base when the tank slides between the preparation position and the installation position. Therefore, the bottom wall of the tank is prevented from being contaminated by sliding of the tank. As a result, the photo-curable resin inside the tank is efficiently irradiated with light through the opening of the base.

Various preferred embodiments of the present invention provide a three-dimensional printing apparatus in which a photo-curable resin is unlikely to adhere or preventing from adhering to an optical device through an opening of a base.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, a three-dimensional printing apparatus according to preferred embodiments of the present invention will be described. Preferred embodiments described herein are naturally not intended to limit the present invention in any way. Components or elements having similar functions are identified by the same reference signs, and redundant description thereof will be omitted or simplified.

Figure 1:
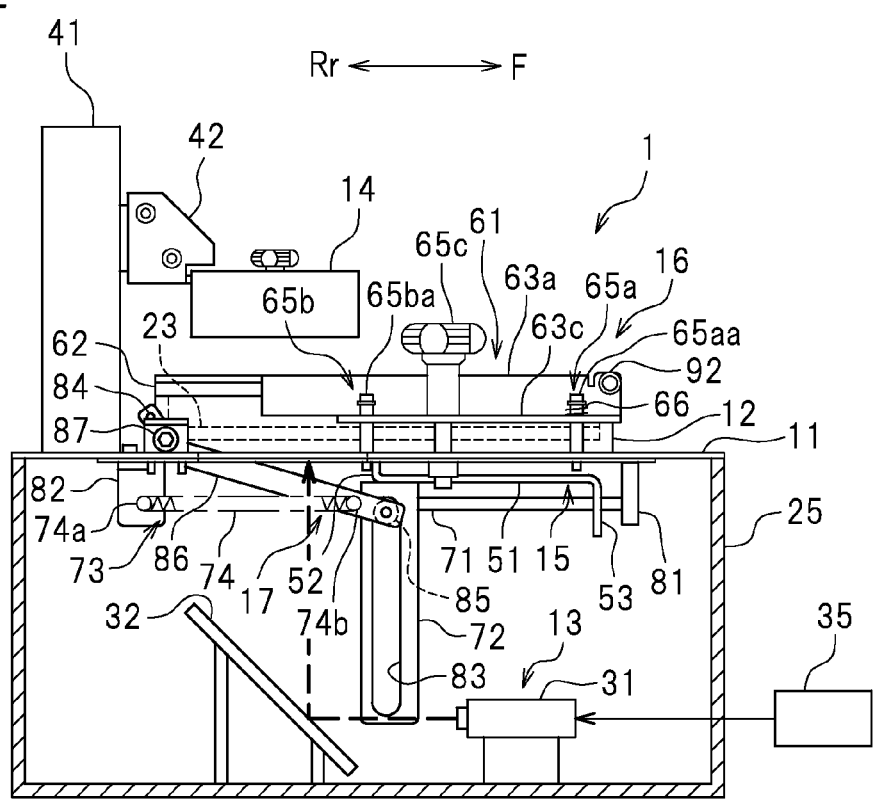
FIG. 1 is a side view illustrating a three-dimensional printing apparatus according to a preferred embodiment of the present invention.

FIG. 1 is a side view illustrating a three-dimensional printing apparatus 1 according to the present preferred embodiment. Note that in the following description, right and left portions of FIG. 1 correspond to front and rear portions of the three-dimensional printing apparatus 1, respectively. In FIGS. 1 to 9, the reference signs "F", "Rr", "L" and "R" indicate front, rear, left and right, respectively. It is to be noted that directions indicated by the reference signs are defined merely for the sake of convenience of description. These directions are not intended to limit how the three-dimensional printing apparatus 1 is installed in any way. As illustrated in FIG. 1, the three-dimensional printing apparatus 1 preferably includes a base 11, a tank 12, and an optical device 13.

Figure 2:
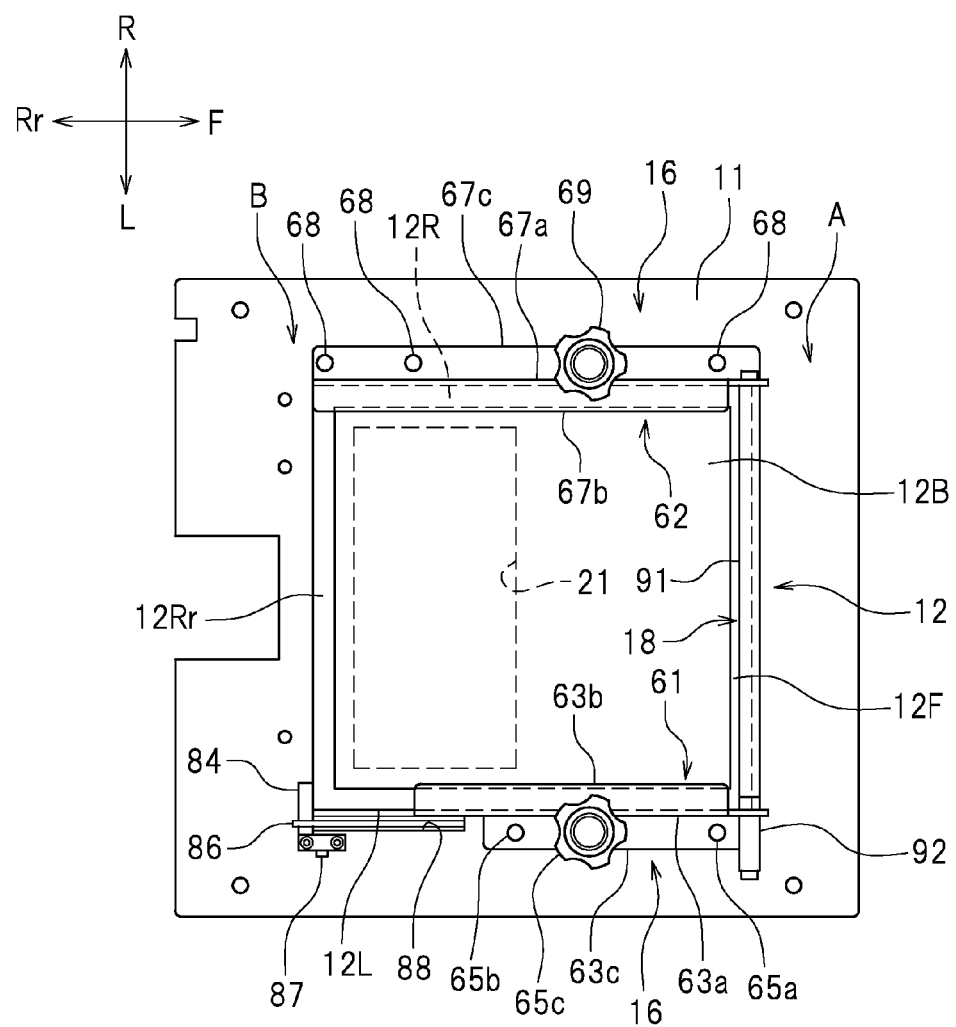
FIG. 2 is a plan view illustrating a base on which a tank is placed.

FIG. 2 is a plan view illustrating the base 11 on which the tank 12 is placed. The base 11 is provided with an opening 21. The opening 21 is not limited to any particular shape. In the present preferred embodiment, the opening 21 preferably has a rectangular shape in a plan view, for example.

As illustrated in FIG. 1, the tank 12 is placed on the base 11. The tank 12 stores a photo-curable resin 23 in liquid form. The photo-curable resin 23 is a resin that is curable by being irradiated with light. The tank 12 is preferably made of a material that allows light to pass therethrough. For example, the tank 12 is preferably made of a material such as a transparent resin or glass. In the present preferred embodiment, the tank 12 is made of a transparent acrylic resin. Note that the tank 12 may be made of such a material as to allow light to pass through at least a portion of a bottom wall 12B (see FIG. 2) of the tank 12.

The tank 12 is a receptacle preferably having a rectangular or substantially rectangular shape in the plan view. It is to be noted that the tank 12 is not limited to any particular shape. As illustrated in FIG. 2, in the present preferred embodiment, the tank 12 preferably includes the bottom wall 12B, a front wall 12F, a rear wall 12Rr, a left wall 12L, and a right wall 12R. Note that each of the front wall 12F, the rear wall 12Rr, the left wall 12L and the right wall 12R is an example of a side wall located laterally of the bottom wall 12B. In the present preferred embodiment, the bottom wall 12B has a flat plate shape. It is to be noted that the bottom wall 12B is not limited to any particular shape. In the plan view, the bottom wall 12B is smaller than the base 11. In the plan view, the bottom wall 12B is larger than the opening 21 provided in the base 11. Note that a surface of the bottom wall 12B may be provided with a layer that prevents undesirable adhesion of the photo-curable resin 23. For example, the surface of the bottom wall 12B may be provided with a silicon layer.

The front wall 12F extends vertically from a front portion of the bottom wall 12B. The rear wall 12Rr extends vertically from a rear portion of the bottom wall 12B. The front wall 12F and the rear wall 12Rr each extend in a right-left direction. The left wall 12L extends vertically from a left portion of the bottom wall 12B. The left wall 12L is continuous with the front wall 12F and the rear wall 12Rr. The right wall 12R extends vertically from a right portion of the bottom wall 12B. The right wall 12R is continuous with the front wall 12F and the rear wall 12Rr. The left wall 12L and the right wall 12R each extend in a front-rear direction. The bottom wall 12B, the front wall 12F, the rear wall 12Rr, the left wall 12L and the right wall 12R preferably are molded in one piece. Alternatively, the bottom wall 12B, the front wall 12F, the rear wall 12Rr, the left wall 12L and the right wall 12R may be molded separately and then assembled to each other.

Figure 3:
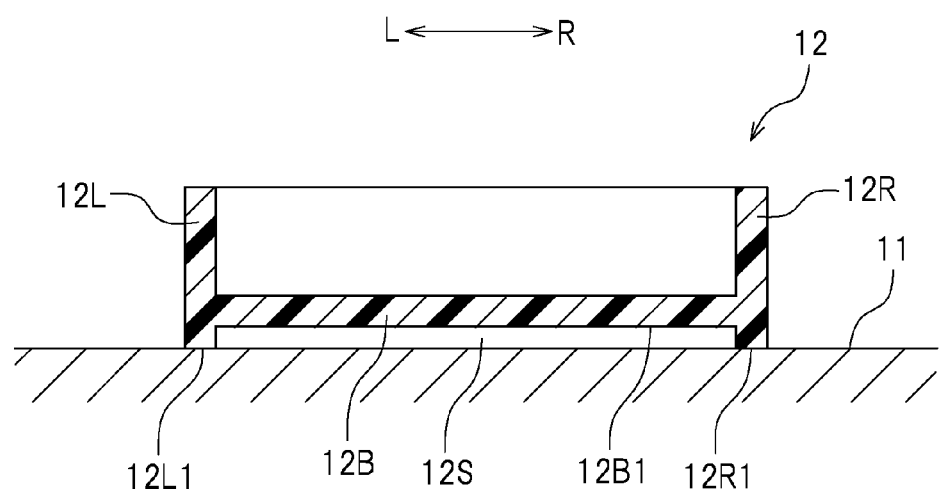
FIG. 3 is a vertical cross-sectional view of the tank.

FIG. 3 is a vertical cross-sectional view of the tank 12. In the present preferred embodiment, a lower surface 12B1 of the bottom wall 12B is located higher than a lower surface 12L1 of the left wall 12L and a lower surface 12R1 of the right wall 12R. In other words, a lower portion of the left wall 12L and a lower portion of the right wall 12R protrude downward relative to the lower surface 12B1 of the bottom wall 12B. Although not illustrated, the lower surface 12B1 of the bottom wall 12B is located higher than a lower surface of the front wall 12F and a lower surface of the rear wall 12Rr. In other words, a lower portion of the front wall 12F and a lower portion of the rear wall 12Rr protrude downward relative to the lower surface 12B1 of the bottom wall 12B. With the tank 12 placed on the base 11, a space 12S is provided between the bottom wall 12B and the base 11. The bottom wall 12B is located away from the base 11. In other words, the bottom wall 12B does not come into contact with the base 11. In this preferred embodiment, the front wall 12F, the rear wall 12Rr, the left wall 12L and the right wall 12R of the tank 12 come into contact with the base 11.

As illustrated in FIG. 1, the optical device 13 irradiates the photo-curable resin 23 inside the tank 12 with light through the opening 21 of the base 11. The optical device 13 is disposed below the base 11. In the present preferred embodiment, the optical device 13 is contained in a case 25 provided under the base 11. The optical device 13 preferably includes a light source 31 and a mirror 32.

The light source 31 emits light. In the present preferred embodiment, the light source 31 is disposed below a front portion of the base 11. The light source 31 emits light from front to rear. The light source 31 is not limited to any particular type. A light source such as a laser diode or a projector, for example, may be suitably used as the light source 31.

In the present preferred embodiment, a control device 35 is connected to the light source 31. The control device 35 is configured or programmed to control the light emitted from the light source 31. More specifically, the control device 35 is configured or programmed to control, for example, a wavelength band of the light, a shape of the light, and timing of emission of the light emitted from the light source 31. The control device 35 is not limited to any particular configuration. For example, the control device 35 may be a computer. The control device 35 may include a central processing unit (hereinafter referred to as a "CPU"), a ROM that stores, for example, a program to be carried out by the CPU, and a RAM or the like.

The mirror 32 reflects the light emitted from the light source 31. In the present preferred embodiment, the mirror 32 is disposed below the opening 21 provided in the base 11. The mirror 32 is disposed behind the light source 31. The mirror 32 is disposed so that its mirror surface faces obliquely upward and forward. The light emitted from the light source 31 is reflected by the mirror 32. Through the opening 21, the photo-curable resin 23 inside the tank 12 is irradiated with the light reflected by the mirror 32. Note that an angle of the mirror 32 is freely controllable. The angle of the mirror 32 is controlled, thus appropriately changing a light irradiation position for the photo-curable resin 23 stored in the tank 12. By appropriately changing the light irradiation position, the photo-curable resin 23 is cured at a desired position. As a result, a desired cross-sectional shape is formed by the cured photo-curable resin 23.

The three-dimensional printing apparatus 1 preferably further includes a holder 14. The holder 14 lifts the photo-curable resin 23 that has been cured with irradiation of the light emitted from the light source 31. The holder 14 is a raisable and lowerable member. In the present preferred embodiment, a rear portion of the base 11 is provided with a support column 41 that extends in an up-down direction. A slider 42 is attached to the support column 41. The slider 42 is raisable and lowerable along the support column 41. The slider 42 is driven to move upward or downward by a motor (not illustrated). In this preferred embodiment, the holder 14 is attached to the slider 42. Thus, the holder 14 is driven to move upward or downward by the motor via the slider 42. The holder 14 is disposed above the opening 21 of the base 11.

The three-dimensional printing apparatus 1 preferably further includes a shutter 15. The shutter 15 covers the opening 21 of the base 11 in an openable and closable manner. In the present preferred embodiment, the shutter 15 is disposed under the base 11. The shutter 15 preferably includes a plate portion 51, a protruded portion 52, and an engagement plate 53.

The shutter 15 is slidable in the front-rear direction. More specifically, the plate portion 51 is slidable in the front-rear direction. Upon rearward movement of the shutter 15, the plate portion 51 is located under the opening 21 of the base 11. In this case, the opening 21 is closed. Upon forward movement of the shutter 15, the plate portion 51 moves out of a position under the opening 21. In this case, the opening 21 is opened. In this manner, the plate portion 51 slides in the front-rear direction, and thus the shutter 15 opens and closes the opening 21. The plate portion 51 has a shape and size which allows the plate portion 51 to cover the opening 21 in the plan view. In this preferred embodiment, similarly to the opening 21, the plate portion 51 preferably has a rectangular or substantially rectangular shape in the plan view. It is to be noted that the plate portion 51 is not limited to any particular shape. For example, the plate portion 51 and the opening 21 may have the same shape in the plan view, or may have different shapes in the plan view. In this preferred embodiment, the plate portion 51 preferably has a horizontal plate shape. Alternatively, the plate portion 51 may have a bent plate shape, or may have any other shape. The protruded portion 52 protrudes upward from a rear end of the plate portion 51. The protruded portion 52 extends in the right-left direction from a left end of the plate portion 51 to a right end thereof. The engagement plate 53 protrudes downward from a front end of the plate portion 51. The engagement plate 53 is provided with a hole 53a (see FIG. 5) that engages with a guide rod 71 (which will be described below).

As illustrated in FIG. 2, the three-dimensional printing apparatus 1 preferably further includes a slide guide 16. Note that in the following description, a position at which the tank 12 is located outside of a region over the opening 21 of the base 11 will be referred to as a "preparation position A" (see FIG. 4), and a position at which the tank 12 is installed over the opening 21 will be referred to as an "installation position B" (see FIG. 2). The slide guide 16 is arranged so that the tank 12 is slidable between the preparation position A and the installation position B. The slide guide 16 guides a sliding operation of the tank 12 on the base 11. In the present preferred embodiment, the slide guide 16 preferably includes a left guide member 61 and a right guide member 62.

The left guide member 61 is attached to a left portion of an upper surface of the base 11. The left guide member 61 extends in the front-rear direction. The left guide member 61 comes into sliding contact with the left wall 12L of the tank 12. In the present preferred embodiment, the left guide member 61 preferably includes a left longitudinal plate 63a, a left upper plate 63b, and a left attachment plate 63c.

The left longitudinal plate 63a extends in the front-rear direction. The left longitudinal plate 63a is disposed in a direction perpendicular to the base 11. The left upper plate 63b extends rightward from an upper end of the left longitudinal plate 63a. In this preferred embodiment, the left wall 12L of the tank 12 may be slidably disposed in a space located rightward of the left longitudinal plate 63a and under the left upper plate 63b. The left attachment plate 63c extends leftward from a lower end of the left longitudinal plate 63a. As illustrated in FIG. 1, the left attachment plate 63c is attached to the base 11 via screws 65a and 65b in this preferred embodiment. The screws 65a and 65b are attached to the base 11. In the present preferred embodiment, the left guide member 61 is slidable in the up-down direction between the base 11 and a head portion 65aa of the screw 65a and between the base 11 and a head portion 65ba of the screw 65b. A spring 66 is provided between the head portion 65aa of the screw 65a and the left attachment plate 63c. The spring 66 urges the left guide member 61 downward. A fixation member 65c is attached to the left guide member 61. The movement of the left guide member 61 in the up-down direction is restricted by the fixation member 65c.

As illustrated in FIG. 2, the right guide member 62 is attached to a right portion of the upper surface of the base 11. The right guide member 62 extends in the front-rear direction. The right guide member 62 comes into sliding contact with the right wall 12R of the tank 12. In the present preferred embodiment, the right guide member 62 preferably includes a right longitudinal plate 67a, a right upper plate 67b, and a right attachment plate 67c.

The right longitudinal plate 67a extends in the front-rear direction. The right longitudinal plate 67a is disposed in a direction perpendicular to the base 11. The right upper plate 67b extends leftward from an upper end of the right longitudinal plate 67a. In this preferred embodiment, the right wall 12R of the tank 12 may be slidably disposed in a space located leftward of the right longitudinal plate 67a and under the right upper plate 67b. The right attachment plate 67c extends rightward from a lower end of the right longitudinal plate 67a. In this preferred embodiment, the right attachment plate 67c is attached to the base 11 via a plurality of screws 68. Although not illustrated, similarly to the left guide member 61, at least one of the plurality of screws 68 may be provided with a spring that urges the right guide member 62 downward. The right guide member 62 is also slidable in the up-down direction. The movement of the right guide member 62 in the up-down direction is restricted by a fixation member 69.

As illustrated in FIG. 1, the three-dimensional printing apparatus 1 preferably further includes an interlocking device 17. The interlocking device 17 opens and closes the shutter 15 in conjunction with the sliding operation of the tank 12 on the base 11. Specifically, when the tank 12 is located over the entire opening 21 of the base 11, the interlocking device 17 opens the shutter 15 so that the opening 21 is opened. When the tank 12 is not located over at least a portion of the opening 21, the interlocking device 17 closes the shutter 15 so that the opening 21 is closed. In the present preferred embodiment, the interlocking device 17 starts to open the shutter 15 after the tank 12 has slid rearward and has been located over the entire opening 21 of the base 11. The interlocking device 17 finishes closing the shutter 15 before the tank 12 slides forward and is not located over at least a portion of the opening 21. In this preferred embodiment, the interlocking device 17 is provided at a left portion of the base 11. It is to be noted that the position at which the interlocking device 17 is provided is not limited to any particular position. For example, the interlocking device 17 may be provided at a right portion of the base 11. The interlocking device 17 preferably includes the guide rod 71, a slider 72, a link member 73, and a tension spring 74.

The guide rod 71 extends in the front-rear direction. In the present preferred embodiment, the guide rod 71 is disposed below the base 11 so as to be in parallel or substantially in parallel with the base 11. Specifically, attachment members 81 and 82 are disposed at front and rear portions of a lower surface of the base 11, respectively. A front end of the guide rod 71 is attached to the attachment member 81. A rear end of the guide rod 71 is attached to the attachment member 82. The guide rod 71 is inserted through the hole 53a (see FIG. 5) provided in the engagement plate 53 of the shutter 15. Thus, the shutter 15 is slidable in the front-rear direction along the guide rod 71.

The slider 72 is provided on the shutter 15 so as to be movable together with the shutter 15. The slider 72 and the shutter 15 may be integral with each other. The slider 72 may be fixed to the shutter 15. In the present preferred embodiment, the slider 72 is provided on a rear left end of a lower surface of the plate portion 51 of the shutter 15. The slider 72 extends downward from the lower surface of the plate portion 51 so that the slider 72 is perpendicular or substantially perpendicular to the plate portion 51. The slider 72 is provided with a guide groove 83. The guide groove 83 extends in a direction perpendicular or substantially perpendicular to the guide rod 71. The guide groove 83 extends along a longitudinal direction of the slider 72. In other words, the guide groove 83 extends in a vertical direction.

The link member 73 transmits movement of the tank 12 to the shutter 15 so that the shutter 15 is opened or closed in response to the movement of the tank 12. The link member 73 preferably includes an abutting portion 84, an engagement portion 85, and a rod portion 86. The abutting portion 84 abuts against the tank 12 when the tank 12 has slid rearward. The abutting portion 84 that has abutted against the tank 12 moves in response to the sliding operation of the tank 12. Note that the abutting portion 84 is an example of an engagement member. In the present preferred embodiment, the abutting portion 84 is arranged so as to abut against a rear portion of the tank 12. Specifically, the abutting portion 84 is disposed above the base 11. The abutting portion 84 is arranged so as to abut against a rear surface of the rear wall 12Rr of the tank 12. The engagement portion 85 is slidably engaged with the guide groove 83 of the slider 72. The rod portion 86 connects the abutting portion 84 and the engagement portion 85 to each other. The abutting portion 84 bends from the rod portion 86 in the present preferred embodiment, but the abutting portion 84 may extend on an extension of the rod portion 86. As illustrated in FIG. 2, in the present preferred embodiment, an insertion hole 88 that extends in the front-rear direction is provided in a region of the left portion of the base 11 which is located rearward relative to a center of the base 11. With the rod portion 86 inserted into the insertion hole 88, the rod portion 86 connects the abutting portion 84 and the engagement portion 85 to each other.

As illustrated in FIG. 1, the link member 73 is provided with a rotation shaft 87. The rotation shaft 87 extends in the right-left direction. The rotation shaft 87 supports a portion of the link member 73 which is located between the abutting portion 84 and the engagement portion 85. In the present preferred embodiment, the slider 72, the engagement portion 85, the rod portion 86 and the rotation shaft 87 constitute a connection member.

The tension spring 74 applies an elastic force to the shutter 15 so that the shutter 15 is closed. The tension spring 74 preferably includes a first end portion (upper end portion) 74a disposed behind the slider 72, and a second end portion (lower end portion) 74b locked to a portion of the link member 73 which is located between the rotation shaft 87 and the engagement portion 85. In the present preferred embodiment, the first end portion 74a of the tension spring 74 is attached to the attachment member 82 disposed at the rear portion of the lower surface of the base 11. The second end portion 74b of the tension spring 74 is attached to the rod portion 86 of the link member 73. The tension spring 74 is an example of an elastic member.

As illustrated in FIG. 2, the three-dimensional printing apparatus 1 preferably further includes a lock mechanism 18. The lock mechanism 18 locks the tank 12 at the installation position B. In the present preferred embodiment, the lock mechanism 18 preferably includes a fixation rod 91 and a knob 92. A first end of the fixation rod 91 is attached to a front portion of the right guide member 62. A second end of the fixation rod 91 is attached to a front portion of the left guide member 61. The fixation rod 91 extends from the front portion of the right guide member 62 to the front portion of the left guide member 61. The fixation rod 91 is rotatable upward about the right guide member 62. The fixation rod 91 moves together with the left guide member 61. Therefore, the fixation rod 91 is rotatable upward until the left attachment plate 63c of the left guide member 61 reaches a position at which the left attachment plate 63c abuts against the head portion 65aa of the screw 65a or the head portion 65ba of the screw 65b. The knob 92 is provided on the second end of the fixation rod 91. A user lifts the knob 92, thus rotating the fixation rod 91. In this case, with the upward rotation of the fixation rod 91, the left guide member 61 also moves upward. Note that the lock mechanism 18 according to the present preferred embodiment is provided merely by way of example, and any other lock mechanism 18 may naturally be used.

Figure 4:
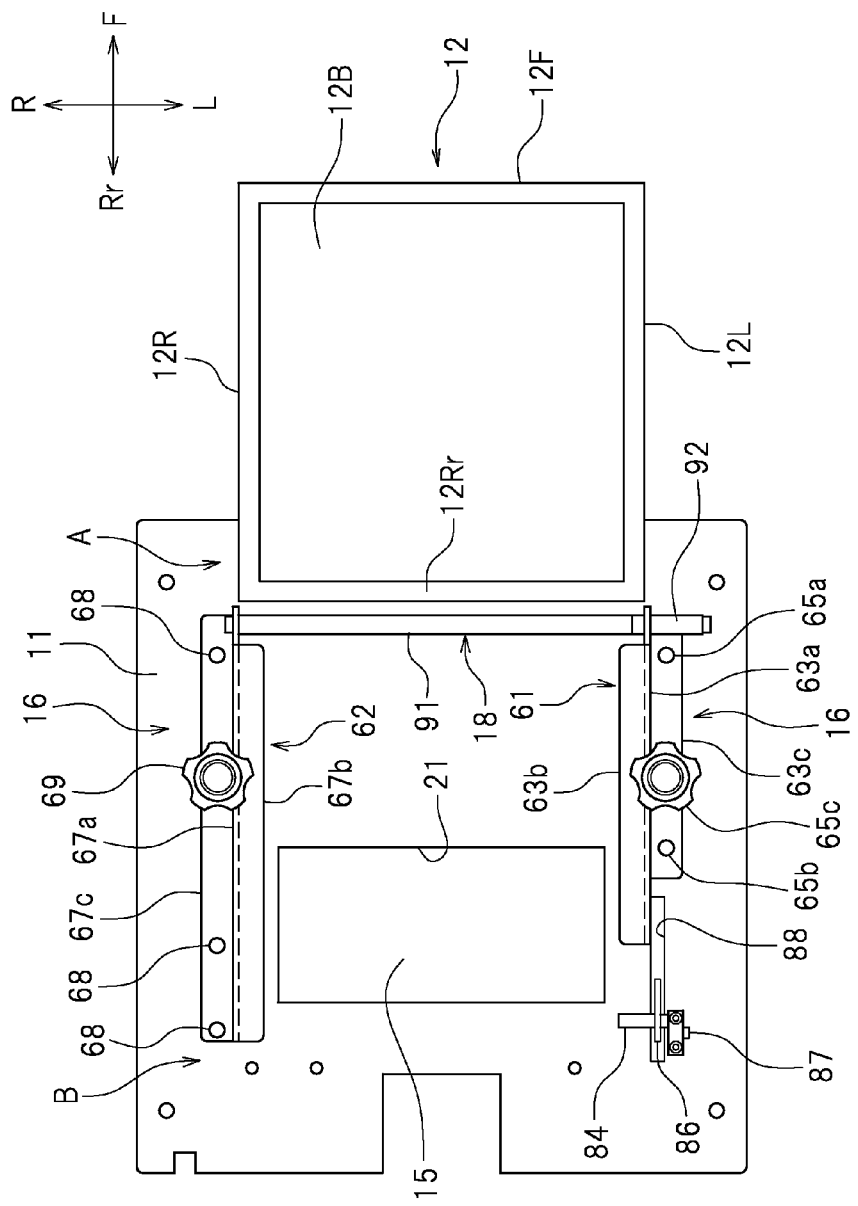
FIG. 4 is a plan view illustrating the tank and the base.
Figure 5:
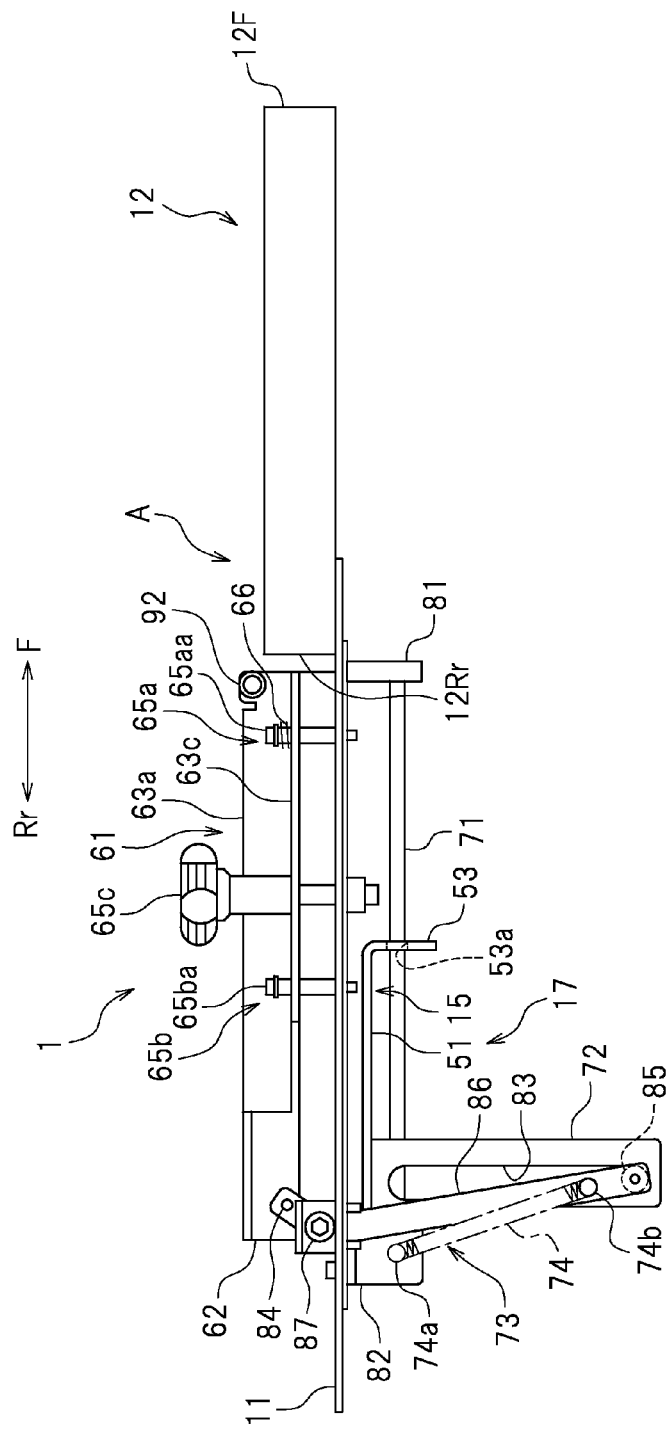
FIG. 5 is a side view illustrating the tank, the base, and an interlocking device.
Figure 6:
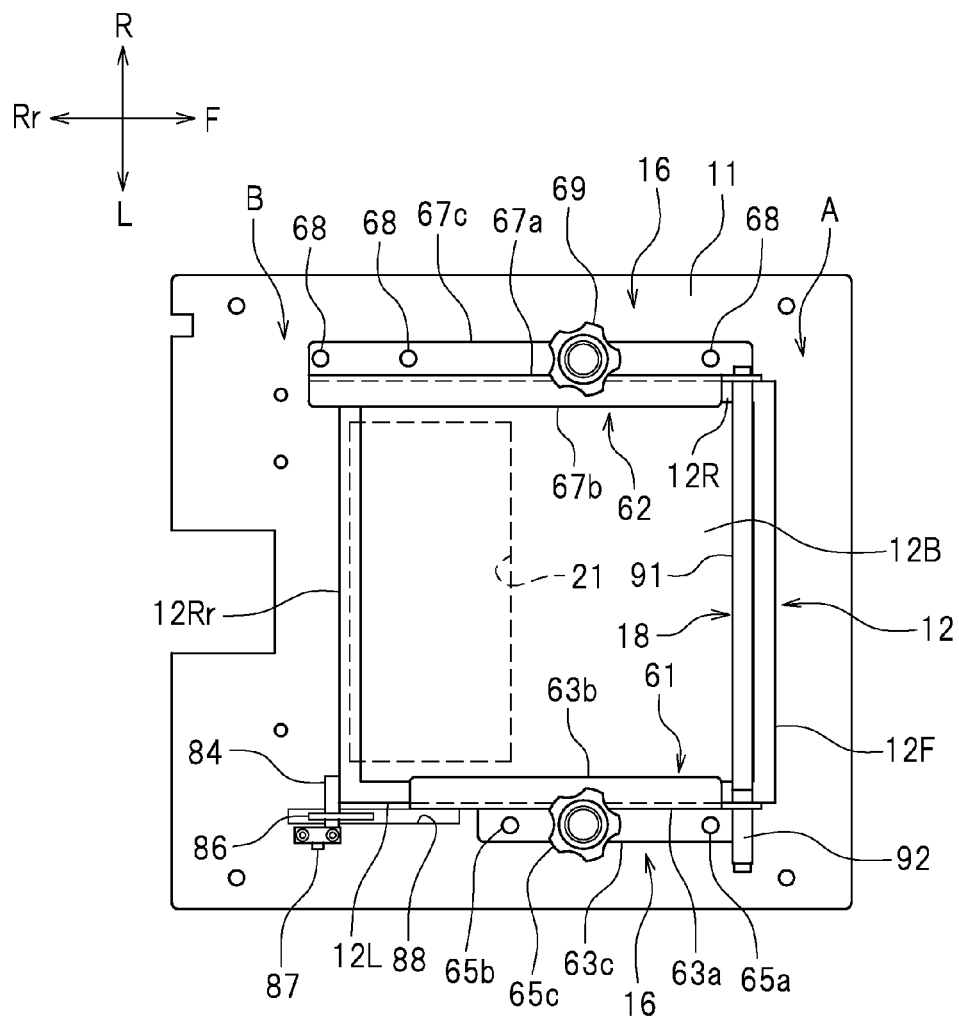
FIG. 6 is a plan view illustrating the tank and the base.
Figure 7:
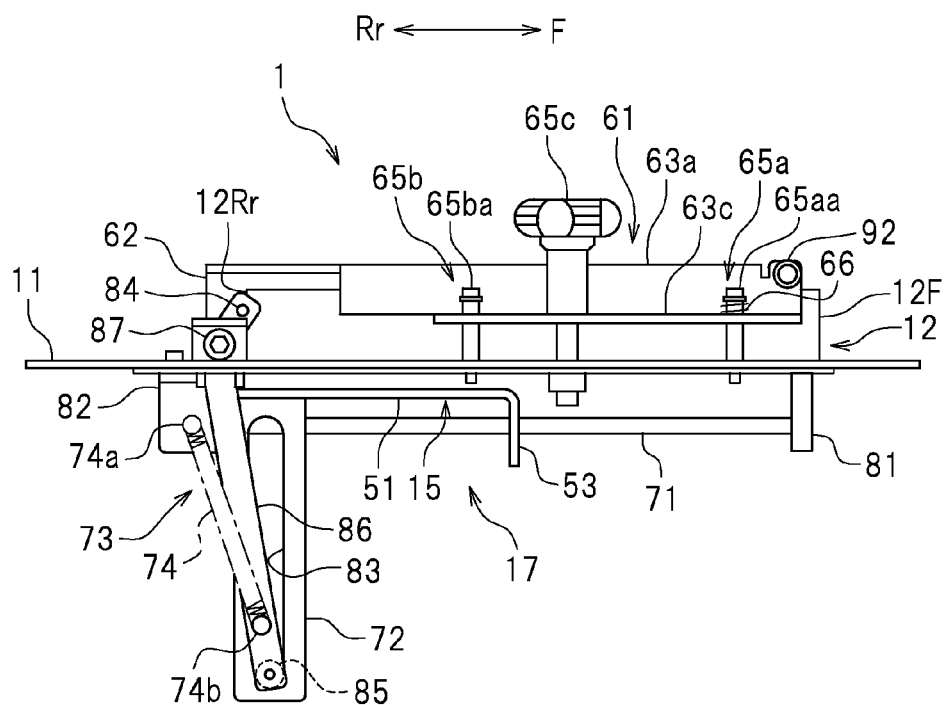
FIG. 7 is a side view illustrating the tank, the base, and the interlocking device.
Figure 8:
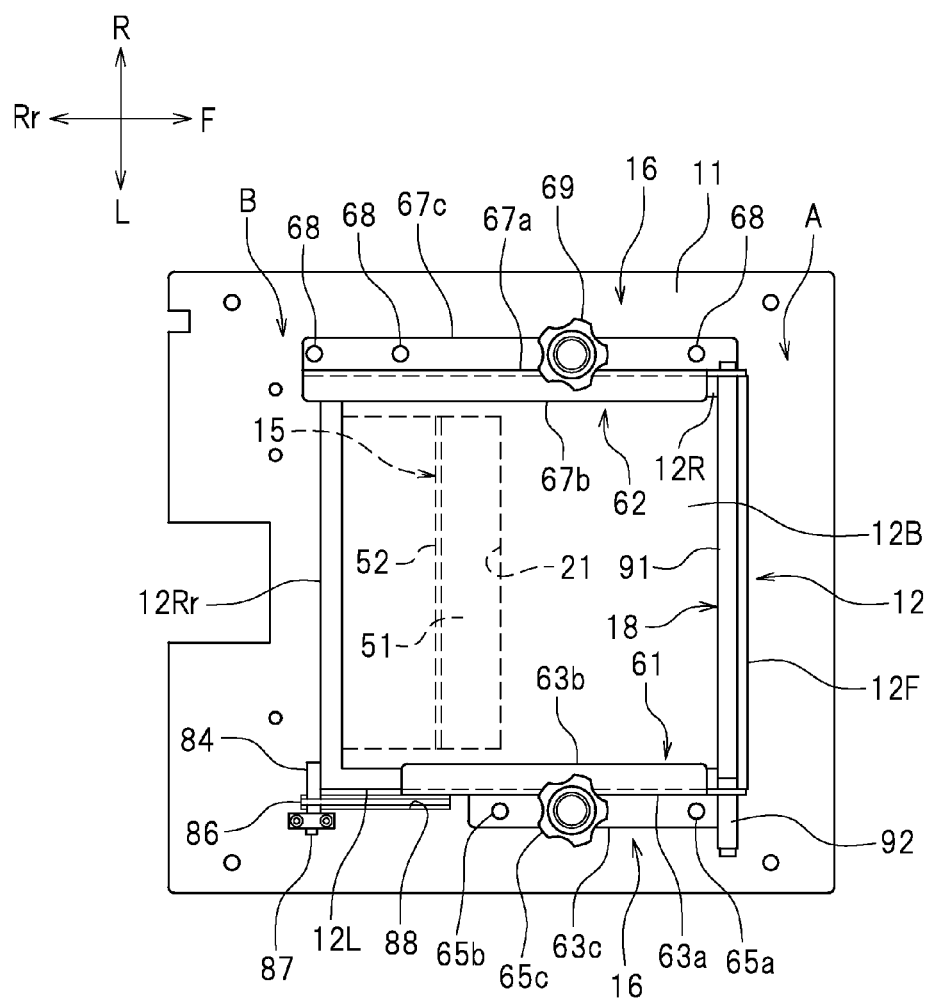
FIG. 8 is a plan view illustrating the tank and the base.
Figure 9:
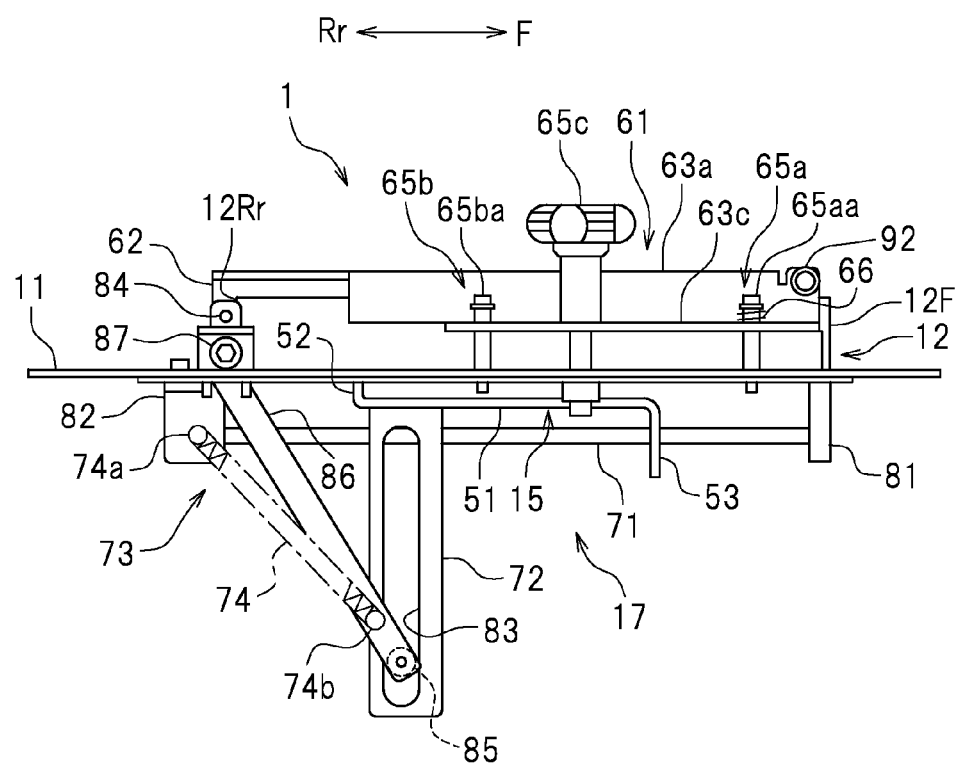
FIG. 9 is a side view illustrating the tank, the base, and the interlocking device.

Next, a procedure for installing the tank 12 on the base 11 will be described. In the present preferred embodiment, when a three-dimensional object is formed, the tank 12 is slid along the slide guide 16. Thus, the tank 12 is disposed over the opening 21 of the base 11. FIGS. 4, 6 and 8 are plan views each illustrating the tank 12 and the base 11. FIGS. 5, 7 and 9 are side views each illustrating the tank 12, the base 11 and the interlocking device 17. FIGS. 4 and 5 each illustrate a state in which the tank 12 is disposed at the preparation position A. FIGS. 6 and 7 each illustrate a state in which the tank 12 is on its way from the preparation position A to the installation position B, and the opening 21 is closed by the shutter 15. FIGS. 8 and 9 each illustrate a state in which the tank 12 is on its way from the preparation position A to the installation position B, and the opening 21 is being opened by the shutter 15. Note that FIGS. 1 and 2 each illustrate a state in which the tank 12 is disposed at the installation position B.

First, as illustrated in FIG. 4, the tank 12 is disposed at the preparation position A. In this case, as illustrated in FIG. 5, the rod portion 86 of the link member 73 is pulled rearward by the tension spring 74. Hence, the slider 72 engaged with the engagement portion 85 of the link member 73 is pulled rearward. Accordingly, the slider 72 is positioned at its rearmost position. As illustrated in FIG. 4, with the tank 12 disposed at the preparation position A, the opening 21 provided in the base 11 is covered with the shutter 15 and is thus closed. Note that as illustrated in FIG. 5, the engagement portion 85 of the link member 73 is located at a lower end of the guide groove 83 of the slider 72. The abutting portion 84 of the link member 73 is inclined forward relative to the rotation shaft 87.

From the state in which the tank 12 is disposed at the preparation position A, the tank 12 is slid rearward along the slide guide 16 until the rear surface of the rear wall 12Rr of the tank 12 abuts against the abutting portion 84 of the link member 73 as illustrated in FIG. 6. In this case, the left wall 12L of the tank is located within the space provided rightward of the left longitudinal plate 63a of the left guide member 61 of the slide guide 16 and under the left upper plate 63b. The right wall 12R of the tank 12 is located within the space provided leftward of the right longitudinal plate 67a of the right guide member 62 of the slide guide 16 and under the right upper plate 67b. Accordingly, the tank 12 is guided along the slide guide 16 and thus moves rearward in a straight line. Note that as illustrated in FIG. 7, until the rear surface of the rear wall 12Rr of the tank 12 abuts against the abutting portion 84, the slider 72 is pulled rearward by the tension spring 74 via the link member 73. Therefore, the shutter 15 remains closed. As illustrated in FIG. 6, a front end of the abutting portion 84 is located rearward relative to a rear end of the opening 21. Hence, until the tank 12 covers the entire opening 21, the tank 12 and the abutting portion 84 do not abut against each other. In other words, when the tank 12 abuts against the abutting portion 84, the opening 21 provided in the base 11 is covered with the shutter 15, and in addition, the opening 21 is covered with the bottom wall 12B of the tank 12.

Subsequently, after the rear wall 12Rr of the tank 12 and the abutting portion 84 have abutted against each other, the tank 12 is slid further rearward along the slide guide 16. In this case, the abutting portion 84 is pushed rearward by the tank 12. Hence, as illustrated in FIG. 9, the link member 73 rotates about the rotation shaft 87. In this case, the abutting portion 84 moves further rearward while abutting against the rear wall 12Rr of the tank 12. With the rotation of the rod portion 86, the engagement portion 85 connected to the rod portion 86 moves obliquely upward and forward. The slider 72 is pushed forward by the engagement portion 85, and is thus moved forward. The engagement portion 85 moves upward along the guide groove 83 of the slider 72. The slider 72 is integral with the shutter 15, and therefore, the shutter 15 slides forward along the guide rod 71 upon forward movement of the slider 72.

As mentioned above, at a point in time when the tank 12 starts abutting against the abutting portion 84, the entire opening 21 of the base 11 is covered with the tank 12. Therefore, the shutter 15 starts to open after the tank 12 has been located over the entire opening 21. As illustrated in FIGS. 8 and 9, when the tank 12 is slid further rearward, the shutter 15 moves further forward. In this case, the opening 21 is gradually opened. Then, when the engagement portion 85 of the link member 73 has reached an upper end of the guide groove 83 of the slider 72 as illustrated in FIG. 1, further rotation of the link member 73 is restricted, thus restricting further rearward movement of the tank 12. In this case, as illustrated in FIG. 2, the tank 12 is positioned at the installation position B. Thus, the entire opening 21 is opened. When the tank 12 has reached the installation position B, the tank 12 is locked by the lock mechanism 18. More specifically, the fixation rod 91 of the lock mechanism 18 is engaged with the front wall 12F of the tank 12, thus restricting forward movement of the tank 12.

Thus, the tank 12 is installed at the installation position B. In this state, three-dimensional printing is started.

Next, a procedure for removing the tank 12 from the base 11 will be described. First, the knob 92 of the lock mechanism 18 is lifted to disengage the fixation rod 91 and the front wall 12F of the tank 12 from each other. In this case, the link member 73 is pulled by the tension spring 74. Upon disengagement of the fixation rod 91 and the front wall 12F of the tank 12 from each other, the link member 73 rotates so that the abutting portion 84 moves forward. Thus, the tank 12 is pushed forward by the abutting portion 84. In this case, the tank 12 slides forward until the rear wall 12Rr of the tank 12 moves away from the abutting portion 84. Upon rotation of the link member 73, the slider 72 is pulled rearward by the engagement portion 85 of the link member 73. The slider 72 is integral with the shutter 15. Therefore, the slider 72 moves rearward, and in addition, the shutter 15 slides rearward along the guide rod 71. Hence, the opening 21 of the base 11 is covered with the shutter 15. When the abutting portion 84 has reached its foremost position (i.e., a position at which the rear wall 12Rr of the tank 12 moves away from the abutting portion 84), the entire opening 21 is closed by the shutter 15.

The position at which the rear wall 12Rr of the tank 12 moves away from the abutting portion 84 corresponds to a position at which the rear wall 12Rr of the tank 12 starts to abut against the abutting portion 84 at the time of installation of the tank 12. As illustrated in FIG. 6, the position at which the tank 12 moves away from the abutting portion 84 is located rearward relative to the rear end of the opening 21. Accordingly, the shutter 15 finishes closing before the tank 12 is not located over at least a portion of the opening 21. After the tank 12 has moved away from the abutting portion 84, the tank 12 is slid further forward. Then, the tank 12 is removed from the slide guide 16.

As described above, according to the present preferred embodiment, the shutter 15 is opened while the tank 12 is located over the entire opening 21 of the base 11 as illustrated in FIG. 1. As illustrated in FIG. 4, the shutter 15 is closed while the tank 12 is not located over at least a portion of the opening 21. Therefore, if the photo-curable resin 23 in liquid form has scattered from the tank 12, the scattered photo-curable resin 23 is prevented from adhering to the optical device 13 through the opening 21. Even if the photo-curable resin 23 scattered from the tank 12 has adhered to the shutter 15, the shutter 15 is opened while the photo-curable resin 23 inside the tank 12 is irradiated with light. Hence, the photo-curable resin 23 that has adhered to the shutter 15 does not interfere with irradiation of the photo-curable resin 23 inside the tank 12 with light.

As illustrated in FIG. 2, the three-dimensional printing apparatus 1 preferably includes the slide guide 16 that guides sliding of tank 12 on the base 11. The tank 12 is moved between the preparation position A and the installation position B by sliding the tank 12 on the base 11. For example, suppose that an apparatus in which the shutter 15 is closed upon detection that the tank 12 is located over the opening 21 of the base 11 is used. In that case, when the tank 12 is placed on the base 11 from above, a gap might be provided between the tank 12 and the base 11, with the shutter 15 opened. However, according to the present preferred embodiment, the tank 12 is moved to a position over the opening 21 by sliding the tank 12 on the base 11, thus preventing a situation where a gap is provided between the tank 12 and the base 11, with the shutter 15 opened. As a result, the photo-curable resin 23 scattered from the tank 12 is more reliably prevented from adhering to the optical device 13 through the opening 21.

Note that in the present preferred embodiment, the user cannot install the tank 12 on the base 11 from above due to the existence of the slide guide 16. Thus, the user is prevented from installing the tank 12 on the base 11 from above.

As illustrated in FIG. 1, the three-dimensional printing apparatus 1 preferably includes the interlocking device 17 that opens and closes the shutter 15 in conjunction with sliding of the tank 12. The interlocking device 17 starts to open the shutter 15 after the tank 12 has been located over the entire opening 21 of the base 11. In other words, the shutter 15 starts to open after the entire opening 21 of the base 11 has been covered with the tank 12. The interlocking device 17 finishes closing the shutter 15 before the tank 12 is not located over at least a portion of the opening 21. In other words, the shutter 15 finishes closing before a portion of the opening 21 is not covered with the tank 12. Thus, the opening 21 of the base 11 is constantly closed with the tank 12 and/or the shutter 15. Consequently, the photo-curable resin 23 scattered from the tank 12 is more reliably prevented from adhering to the optical device 13 through the opening 21.

The interlocking device 17 according to the present preferred embodiment mechanically and automatically opens and closes the shutter 15 in response to sliding of the tank 12. Therefore, a sensor for detection of the tank 12 is unnecessary. A motor by which the shutter 15 is driven is also unnecessary. Hence, cost for the three-dimensional printing apparatus 1 is reduced. For example, suppose that an apparatus in which a shutter driving motor is controlled on the basis of detection by a sensor is used. In that case, a control time delay occurs between the detection by the sensor and opening or closing of the shutter. Thus, in such an apparatus, the shutter 15 might remain open even though the opening 21 is not covered with the tank 12. However, according to the present preferred embodiment, the above-mentioned control is unnecessary, and therefore, such a control time delay does not occur. Consequently, adhesion of the photo-curable resin 23 to the optical device 13 resulting from a control time delay is prevented.

The interlocking device 17 according to the present preferred embodiment opens and closes the shutter 15 in response to sliding of the tank 12 by using a simple and inexpensive structure.

As illustrated in FIG. 2, the three-dimensional printing apparatus 1 preferably includes the lock mechanism 18 that locks the tank 12 at the installation position B. Thus, even if a shock is applied to the tank 12 when a three-dimensional object is being formed, the tank 12 does not move out of the installation position B. Hence, the tank 12 is stably held at the installation position B. Via the link member 73, the tank 12 constantly receives, from the tension spring 74, a force exerted in a direction toward the preparation position A. However, the three-dimensional printing apparatus 1 includes the lock mechanism 18, and therefore, the tank 12 is stably held at the installation position B even though the tank 12 constantly receives the force from the tension spring 74.

The slide guide 16 preferably includes the left guide member 61 and the right guide member 62. The left guide member 61 comes into sliding contact with the left wall 12L of the tank 12. The right guide member 62 comes into sliding contact with the right wall 12R of the tank 12. Thus, the tank 12 is slid on the base 11 by using a simple structure. The tank 12 is slid in a straight line. As a result, the tank 12 is easily installed at the installation position B.

For example, suppose that the photo-curable resin 23 in liquid form has adhered onto the plate portion 51 of the shutter 15. In that case, when the shutter 15 moves forward, the photo-curable resin 23 might trickle down from the rear end of the plate portion 51. The photo-curable resin 23 that has trickled down might adhere to the optical device 13. However, according to the present preferred embodiment, the shutter 15 includes the protruded portion 52 that protrudes upward from the rear end of the plate portion 51 as illustrated in FIG. 1. Therefore, when the shutter 15 moves forward, the photo-curable resin 23 on the plate portion 51 is stopped by the protruded portion 52. Hence, the photo-curable resin 23 on the plate portion 51 is prevented from trickling down from the plate portion 51. Consequently, the photo-curable resin 23 is prevented from adhering to the optical device 13.

As illustrated in FIG. 3, in the present preferred embodiment, the lower surface 12B1 of the bottom wall 12B of the tank 12 is located higher than the lower surfaces of the other walls of the tank 12, i.e., the lower surface of the front wall 12F, the lower surface of the rear wall 12Rr, the lower surface 12L1 of the left wall 12L, and the lower surface 12R1 of the right wall 12R. Thus, the bottom wall 12B of the tank 12 does not come into contact with the base 11 when the tank 12 slides between the preparation position A and the installation position B. Therefore, the bottom wall 12B of the tank 12 is prevented from being contaminated by the sliding operation of the tank 12. A portion of the tank 12 which is to be located over the opening 21 of the base 11 is the bottom wall 12B. The photo-curable resin 23 inside the tank 12 is irradiated with light through the bottom wall 12B. According to the present preferred embodiment, the bottom wall 12B is unlikely to be contaminated, thus efficiently irradiating the photo-curable resin 23 inside the tank 12 with light.

One preferred embodiment of the present invention has been described thus far. However, the foregoing preferred embodiment is merely illustrative, and the present invention may be embodied in various other forms.

As illustrated in FIG. 1, in the foregoing preferred embodiment, the tank 12 is placed over the opening 21 of the base 11 preferably by sliding the tank 12 from front to rear. However, the direction in which the tank 12 is slid is not limited to any particular direction. For example, the tank 12 may be placed over the opening 21 of the base 11 by sliding the tank 12 from left to right or from right to left. In that case, the slide guide 16 preferably extends in the right-left direction.

In the foregoing preferred embodiment, the slide guide 16 preferably includes the left guide member 61 and the right guide member 62. Alternatively, the slide guide 16 may include only one of the left guide member 61 and the right guide member 62.

As illustrated in FIG. 3, in the foregoing preferred embodiment, the lower surfaces of the front, rear, left and right walls of the tank 12, i.e., the lower surface of the front wall 12F, the lower surface of the rear wall 12Rr, the lower surface 12L1 of the left wall 12L, and the lower surface 12R1 of the right wall 12R, are preferably located lower than the lower surface 12B1 of the bottom wall 12B of the tank 12. However, the lower surfaces of the walls of the tank 12 do not necessarily have to be located in this manner in order to prevent contact between the bottom wall 12B of the tank 12 and the base 11. For example, only the lower surfaces of the front and rear walls 12F and 12Rr of the tank 12 may be located lower than the lower surface 12B1 of the bottom wall 12B. Alternatively, only the lower surface 12L1 of the left wall 12L and the lower surface 12R1 of the right wall 12R may be located lower than the lower surface 12B1 of the bottom wall 12B. It is not necessary that the entire lower surface of the front wall 12F, the entire lower surface of the rear wall 12Rr, the entire lower surface 12L1 of the left wall 12L, and the entire lower surface 12R1 of the right wall 12R be located lower than the lower surface 12B1 of the bottom wall 12B. For example, only lower surfaces of four corners of the tank 12 may be located lower than the lower surface 12B1 of the bottom wall 12B.

As illustrated in FIG. 1, in the foregoing preferred embodiment, the tension spring 74 that pulls the shutter 15 rearward via the link member 73 and the slider 72 preferably is used as the elastic member that applies an elastic force to the shutter 15 so as to close the shutter 15. However, the elastic member is not limited to the tension spring 74. For example, a compression spring that pushes the shutter 15 rearward via the link member 73 and the slider 72 may be used as the elastic member. Alternatively, a torsion spring that applies a rotational force to the link member 73 with respect to the rotation shaft 87 may be used as the elastic member.

In the foregoing preferred embodiment, the abutting portion 84 of the link member 73 preferably is arranged to abut against the rear wall 12Rr of the tank 12. However, the abutting portion 84 does not necessarily have to abut against the rear wall 12Rr. For example, the left wall 12L of the tank 12 may be provided with a portion which extends leftward and against which the abutting portion 84 is to be abutted. This portion will be referred to as an "abutted portion". The abutting portion 84 of the link member 73 may abut against the abutted portion. In that case, the abutting portion 84 and the abutted portion preferably abut against each other after the tank 12 has slid rearward and the entire opening 21 has been covered with the tank 12.

In the foregoing preferred embodiment, the interlocking device 17 preferably opens and closes the shutter 15 mechanically in conjunction with sliding of the tank 12. However, the interlocking device 17 may open and close the shutter 15 electrically in conjunction with the sliding operation of the tank 12. The shutter 15 may be opened and closed by being controlled electrically. For example, the three-dimensional printing apparatus 1 may include an actuator such as a motor by which the shutter 15 is opened and closed, and a sensor that detects whether or not the tank 12 is installed at the installation position B. In that case, upon detection by the sensor that the tank 12 has been installed at the installation position B, the control device 35 may control the actuator, thus opening the shutter 15.

The terms and expressions used herein are used for explanation purposes and should not be construed as being restrictive. It should be appreciated that the terms and expressions used herein do not eliminate any equivalents of features illustrated and mentioned herein, and allow various modifications falling within the claimed scope of the present invention. The present invention may be embodied in many different forms. The present disclosure is to be considered as providing examples of the principles of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing apparatus comprising:
a base including an opening;
a tank placed on the base and storing a photo-curable resin in liquid form;
an optical device disposed below the base and including at least a light source that emits light, the optical device being configured to irradiate the photo-curable resin inside the tank with the light emitted from the light source through the opening;
a raisable and lowerable holder configured to lift the photo-curable resin that has been cured with irradiation of the light;
a shutter configured to cover the opening in an openable and closable manner;
a slide guide configured to guide sliding of the tank on the base so that the tank is slidable between a preparation position located outside of a region over the opening and an installation position located over the opening; and
an interlocking device configured to open and close the shutter in conjunction with sliding of the tank on the base so that the shutter is opened when the tank is located over the entire opening, and the shutter is closed when the tank is not located over at least a portion of the opening; wherein
the interlocking device includes:
an engagement member configured to engage with the tank and move in response to sliding of the tank;
a connection member configured to connect the engagement member and the shutter to each other so that the shutter is opened and closed in response to the movement of the engagement member; and
an elastic member configured to apply an elastic force to the shutter so that the shutter is closed, wherein
the interlocking device is configured to move the shutter in conjunction with sliding of the tank so that the interlocking device starts opening the shutter after the tank has slid to a position at which the tank is located over the entire opening, and finishes closing the shutter before the tank slides to a position at which the tank is not located over at least a portion of the opening.

2. A three-dimensional printing apparatus comprising:
a base including an opening;
a tank placed on the base and storm a photo-curable resin in liquid form;
an optical device disposed below the base and including at least a light source that emits light, the optical device being configured to irradiate the photo-curable resin inside the tank with the light emitted from the light source through the opening;
a raisable and lowerable holder configured to lift the photo-curable resin that has been cured with irradiation of the light;
a shutter configured to cover the opening in an openable and closable manner;
a slide guide configured to guide sliding of the tank on the base so that the tank is slidable between a preparation position located outside of a region over the opening and an installation position located over the opening; and
an interlocking device configured to open and close the shutter in conjunction with sliding of the tank on the base so that the shutter is opened when the tank is located over the entire opening, and the shutter is closed when the tank is not located over at least a portion of the opening; wherein
the interlocking device includes:
    an engagement member configured to engage with the tank and move in response to sliding of the tank;
    a connection member configured to connect the engagement member and the shutter to each other so that the shutter is opened and closed in response to the movement of the engagement member; and
    an elastic member configured to apply an elastic force to the shutter so that the shutter is closed, wherein
when the tank slides from the installation position toward the preparation position, the tank is configured to slide forward, and when the tank slides from the preparation position toward the installation position, the tank is configured to slide rearward; and
the interlocking device further includes a guide rod extending in a front-rear direction;
the connection member includes a slider, an engagement portion, a rod portion, and a rotation shaft;
the elastic member is a tension spring;
the slider is arranged on the shutter so as to be movable together with the shutter and slidably engaged with the guide rod, the slider being provided with a guide groove that extends in a vertical direction;
the engagement member abuts against a rear portion of the tank, the engagement portion is slidably engaged with the guide groove of the slider, and the rod portion connects the engagement member and the engagement portion to each other;
the rotation shaft extends in a right-left direction and supports a portion of the link member which is located between the abutting portion and the engagement portion; and
the tension spring includes an upper end portion disposed behind the slider and a lower end portion locked to a portion of the link member which is located between the rotation shaft and the engagement portion.

3. The three-dimensional printing apparatus according to claim 1, further comprising a lock mechanism configured to lock the tank at the installation position.

4. The three-dimensional printing apparatus according to claim 1, wherein
when the tank slides from the installation position toward the preparation position, the tank is configured to slide forward, and when the tank slides from the preparation position toward the installation position, the tank is configured to slide rearward;
the tank includes a bottom wall, a left wall that extends vertically from a left portion of the bottom wall, and a right wall that extends vertically from a right portion of the bottom wall, and
the slide guide includes:
    a left guide member attached onto the base and including a left longitudinal plate that extends in a front-rear direction and a left upper plate that extends rightward from the left longitudinal plate, the left guide member being configured to come into sliding contact with the left wall of the tank; and
    a right guide member attached onto the base and including a right longitudinal plate that extends in the front-rear direction and a right upper plate that extends leftward from the right longitudinal plate, the right guide member being configured to come into sliding contact with the right wall of the tank.

5. A three-dimensional printing apparatus comprising:
a base including an opening;
a tank placed on the base and storing a photo-curable resin in liquid form;
an optical device disposed below the base and including at least a light source that emits light, the optical device being configured to irradiate the photo-curable resin inside the tank with the light emitted from the light source through the opening;
a raisable and lowerable holder configured to lift the photo-curable resin that has been cured with irradiation of the light;
a shutter configured to cover the opening in an openable and closable manner;
a slide guide configured to guide sliding of the tank on the base so that the tank is slidable between a preparation position located outside of a region over the opening and an installation position located over the opening; and
an interlocking device configured to open and close the shutter in conjunction with sliding of the tank on the base so that the shutter is opened when the tank is located over the entire opening, and the shutter is closed when the tank is not located over at least a portion of the opening; wherein
the interlocking device includes:
    an engagement member configured to engage with the tank and move in response to sliding of the tank;
    a connection member configured to connect the engagement member and the shutter to each other so that the shutter is opened and closed in response to the movement of the engagement member; and
    an elastic member configured to apply an elastic force to the shutter so that the shutter is closed, wherein
when the tank slides from the installation position toward the preparation position, the tank is configured to slide forward, and when the tank slides from the preparation position toward the installation position, the tank is configured to slide rearward; and the shutter includes a plate portion slidable in a front-rear direction, and a protruded portion that protrudes upward from a rear end of the plate portion.

6. The three-dimensional printing apparatus according to claim 1, wherein
the tank includes a bottom wall, and side walls located laterally of the bottom wall; and
a lower surface of the bottom wall is located higher than lower surfaces of the side walls.

7. The three-dimensional printing apparatus according to claim 2, further comprising a lock mechanism configured to lock the tank at the installation position.

8. The three-dimensional printing apparatus according to claim 2, wherein
when the tank slides from the installation position toward the preparation position, the tank is configured to slide forward, and when the tank slides from the preparation position toward the installation position, the tank is configured to slide rearward;
the tank includes a bottom wall, a left wall that extends vertically from a left portion of the bottom wall, and a right wall that extends vertically from a right portion of the bottom wall, and
the slide guide includes:
a left guide member attached onto the base and including a left longitudinal plate that extends in a front-rear direction and a left upper plate that extends rightward from the left longitudinal plate, the left guide member being configured to come into sliding contact with the left wall of the tank; and
a right guide member attached onto the base and including a right longitudinal plate that extends in the front-rear direction and a right upper plate that extends leftward from the right longitudinal plate, the right guide member being configured to come into sliding contact with the right wall of the tank.

9. The three-dimensional printing apparatus according to claim 2, wherein the tank includes a bottom wall, and side walls located laterally of the bottom wall; and
a lower surface of the bottom wall is located higher than lower surfaces of the side walls.

10. The three-dimensional printing apparatus according to claim 5, further comprising a lock mechanism configured to lock the tank at the installation position.

11. The three-dimensional printing apparatus according to claim 5, wherein
when the tank slides from the installation position toward the preparation position, the tank is configured to slide forward, and when the tank slides from the preparation position toward the installation position, the tank is configured to slide rearward;
the tank includes a bottom wall, a left wall that extends vertically from a left portion of the bottom wall, and a right wall that extends vertically from a right portion of the bottom wall, and
the slide guide includes:
a left guide member attached onto the base and including a left longitudinal plate that extends in a front-rear direction and a left upper plate that extends rightward from the left longitudinal plate, the left guide member being configured to come into sliding contact with the left wall of the tank; and
a right guide member attached onto the base and including a right longitudinal plate that extends in the front-rear direction and a right upper plate that extends leftward from the right longitudinal plate, the right guide member being configured to come into sliding contact with the right wall of the tank.

12. The three-dimensional printing apparatus according to claim 5, wherein
the tank includes a bottom wall, and side walls located laterally of the bottom wall; and
a lower surface of the bottom wall is located higher than lower surfaces of the side walls.

* * * * *